United States Patent
Liu et al.

(10) Patent No.: US 11,592,587 B2
(45) Date of Patent: Feb. 28, 2023

(54) HIGH RESOLUTION FULL WAVEFORM INVERSION

(71) Applicant: Saudi Arabian Oil Company, Dhahran (SA)

(72) Inventors: Hongwei Liu, Dhahran (SA); Yi Luo, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 400 days.

(21) Appl. No.: 16/841,392

(22) Filed: Apr. 6, 2020

(65) Prior Publication Data

US 2021/0311215 A1 Oct. 7, 2021

(51) Int. Cl.
*G01V 1/30* (2006.01)
*E21B 49/00* (2006.01)
*G01V 1/28* (2006.01)

(52) U.S. Cl.
CPC .......... *G01V 1/303* (2013.01); *E21B 49/00* (2013.01); *G01V 1/282* (2013.01); *E21B 2200/20* (2020.05); *G01V 2210/612* (2013.01); *G01V 2210/6161* (2013.01); *G01V 2210/6222* (2013.01)

(58) Field of Classification Search
CPC ..... E21B 2200/20; E21B 49/00; G01V 1/282; G01V 1/303; G01V 2210/612; G01V 2210/6161; G01V 2210/6222
See application file for complete search history.

(56) References Cited

U.S. PATENT DOCUMENTS

| 2013/0311149 A1 | 11/2013 | Tang et al. |
| 2016/0282490 A1* | 9/2016 | Qin ................ G01V 1/303 |
| 2017/0168178 A1 | 6/2017 | Crawley et al. |
| 2018/0120464 A1* | 5/2018 | Sun ................ G01V 1/282 |
| 2019/0154857 A1 | 5/2019 | Wang et al. |

(Continued)

FOREIGN PATENT DOCUMENTS

| EP | 3073296 | 9/2016 |
| EP | 3274740 | 1/2018 |

OTHER PUBLICATIONS

Mousavi et al., "Automatic noise-removal/signal-removal based on general cross-validation thresholding in synchrosqueezed domain and its application on earthquake data", Geophysics, vol. 82, No. 4 (Jul.-Aug. 2017); p. V211-V227 (Year: 2017).*

(Continued)

*Primary Examiner* — Regis J Betsch
(74) *Attorney, Agent, or Firm* — Fish & Richardson P.C.

(57) ABSTRACT

Disclosed are methods, systems, and computer-readable medium to perform operations including: generating, using a source wavelet and a current velocity model, modeled seismic data of the subterranean formation; applying a pre-condition to a seismic data residual calculated using the modeled seismic data and acquired seismic data from the subterranean formation; generating a velocity update using the source wavelet and the pre-conditioned seismic data residual; updating, using the velocity update, the current velocity model to generate an updated velocity model; determining that the current velocity model satisfies a pre-determined condition; and responsively determining that the updated velocity model is the velocity model of the subterranean formation.

17 Claims, 15 Drawing Sheets

(56) References Cited

U.S. PATENT DOCUMENTS

2019/0179047 A1  6/2019  Kim et al.
2019/0187312 A1  6/2019  Ramox-Martinez et al.
2019/0302293 A1  10/2019 Zhang et al.

OTHER PUBLICATIONS

Yu et al., "Removal of Random Noise in Seismic Data by Time-varying Window-length Time-frequency Peak Filtering", Acta Geophysica, Institute of Geophysics, Polish Academy of Sciences, DOI: 10.1515/acgeo-2016-0059 (Year: 2016).*

Hadziioannou et al., "Improving temporal resolution in ambient noise monitoring of seismic wave speed", Journal of Geophysical Research, vol. 116, B07304, doi:10.1029/2011JB008200, 2011 (Year: 2011).*

PCT International Search Report and Written Opinion in International Appln. No. PCT/US2021/025963, dated Jul. 14, 2021, 15 pages.

* cited by examiner

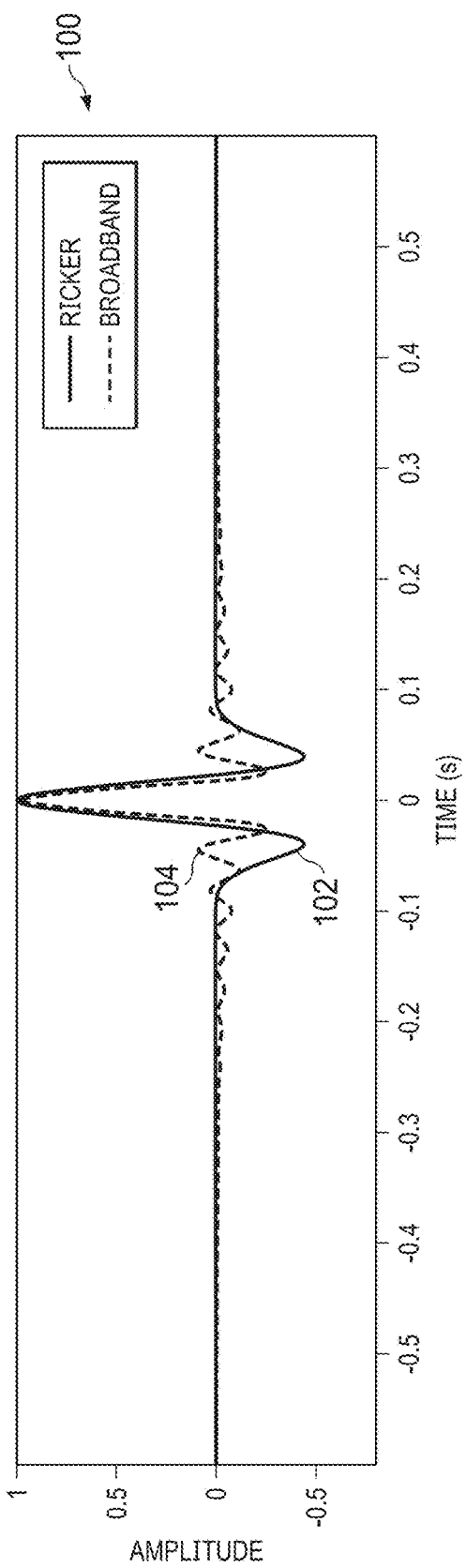
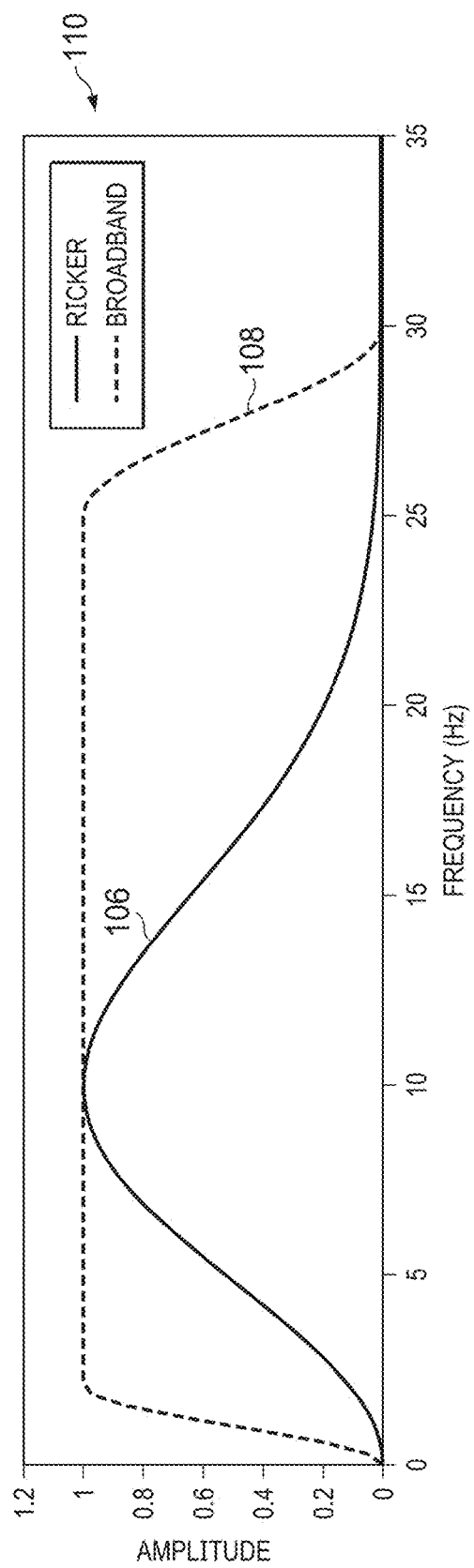

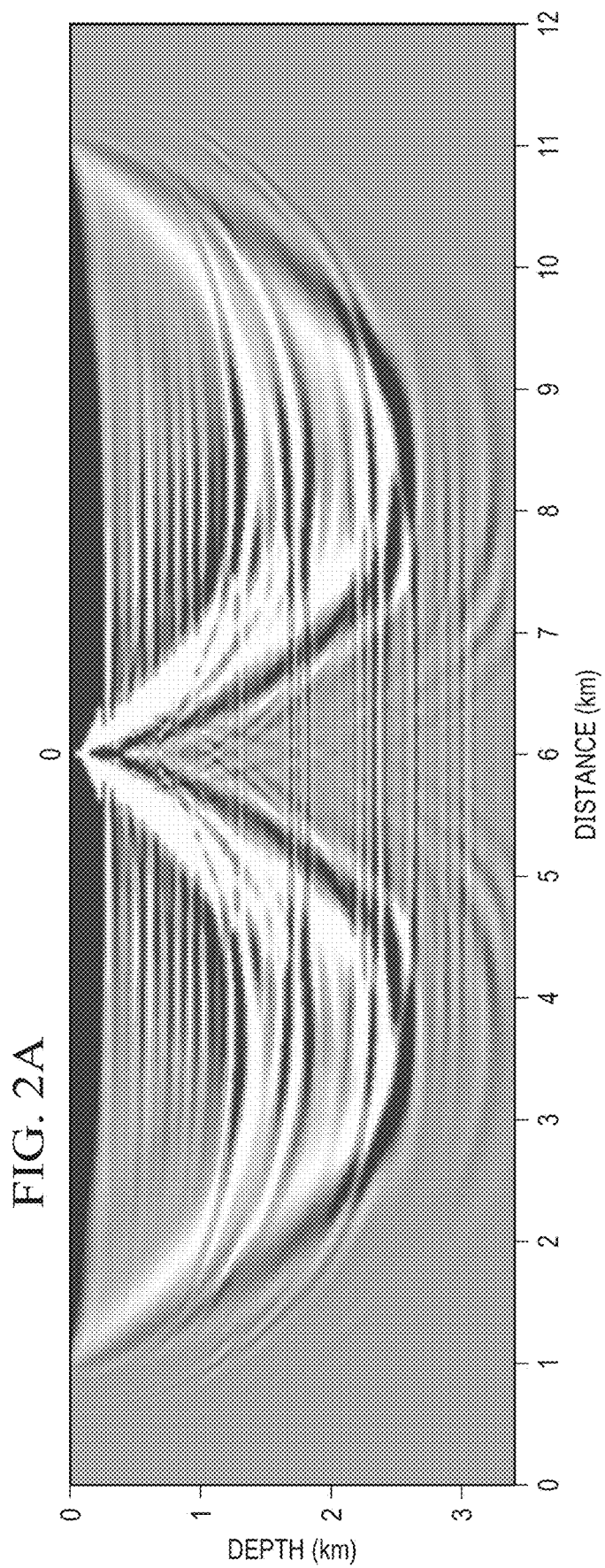

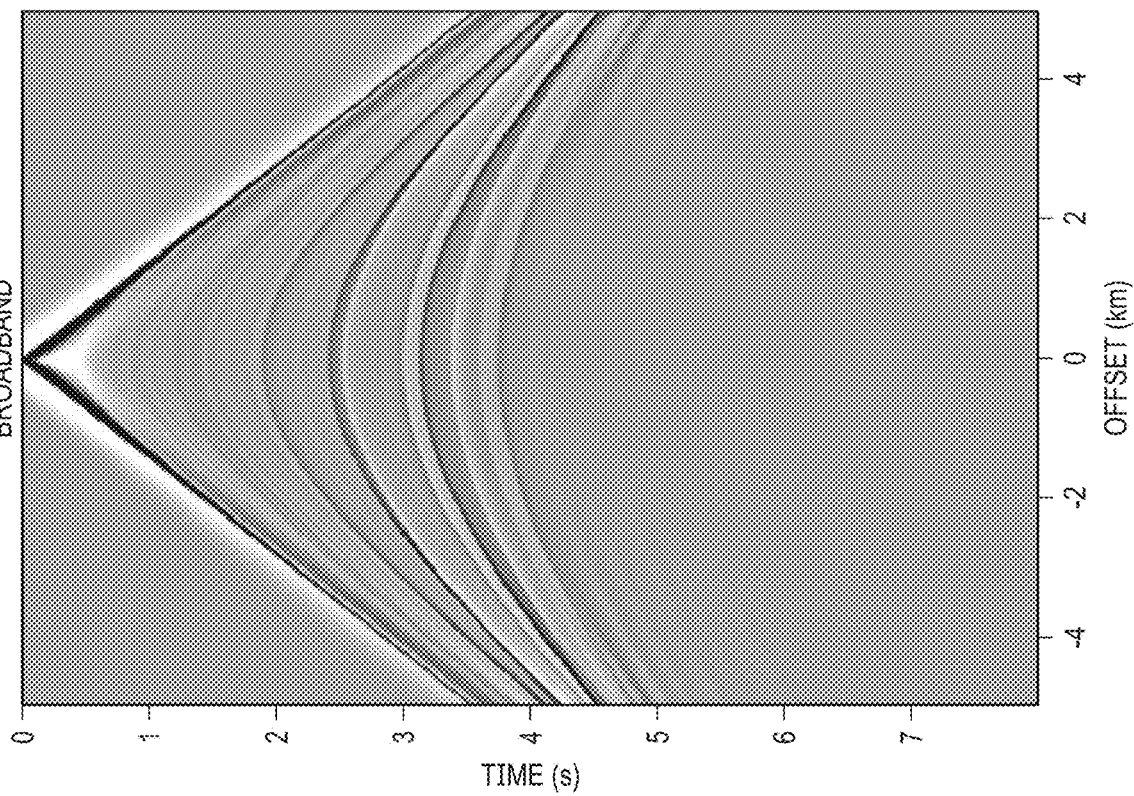
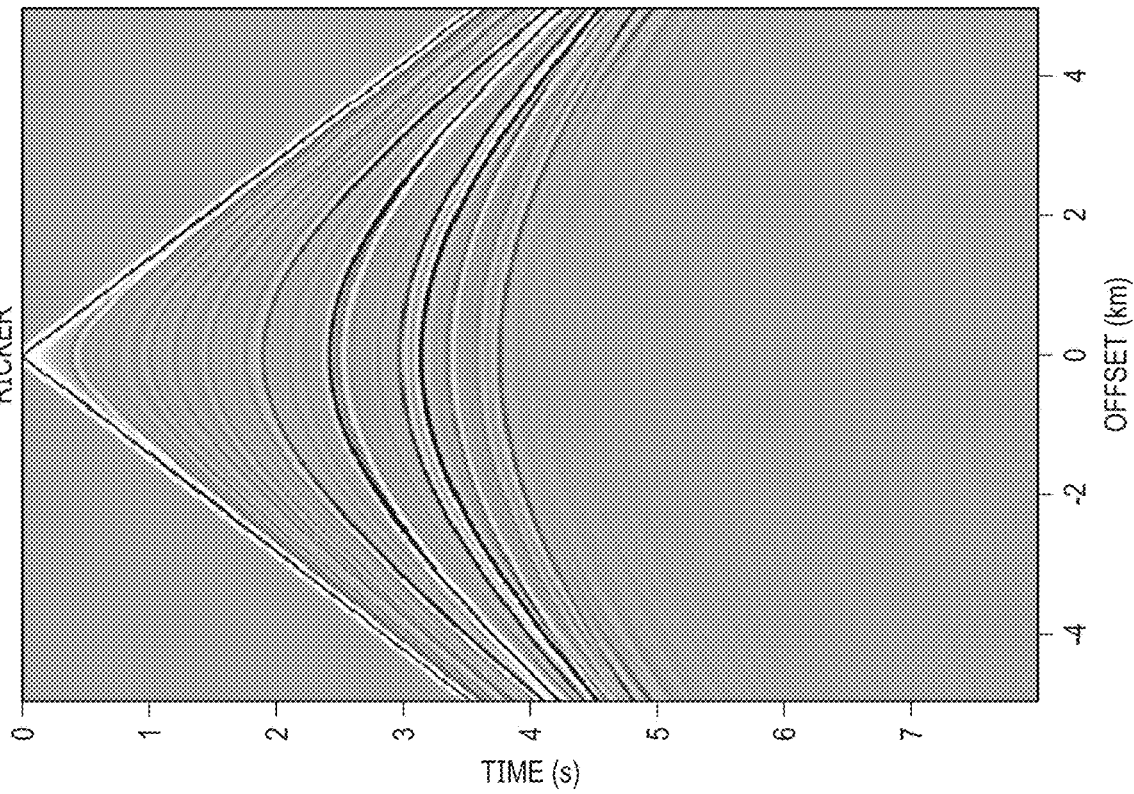

HIGH RESOLUTION FULL WAVEFORM INVERSION

TECHNICAL FIELD

This disclosure relates to systems and methods for representing subterranean formations.

BACKGROUND

Seismic images are used to represent underground layers of rocks or a subsurface of a formation. These images are generally generated by sending probing elastic waves into the subsurface and measuring wave echoes that reflect different properties of the subsurface. One example property generated using seismic waves is a velocity model of the subsurface. Traditionally, velocity models have been built using a ray-tomography method. However, as the complexity of the subsurface increases, a more accurate method of velocity model building is needed.

SUMMARY

More recently, a technology called full waveform inversion (FWI) has become increasingly popular for building velocity models. Full waveform inversion is an iterative approach that reduces residual energy between modeled and observed seismic data of a subsurface by iteratively updating a velocity model of the subsurface.

This disclosure describes a closed-loop workflow for high-resolution full waveform inversion (HR-FWI). HR-FWI involves an up-going and down-going wavefield separation imaging condition to generate a reflection image and a velocity update. In the disclosed workflow, the low frequency components are preserved during FWI, thereby enhancing the resolution of the FWI result. In an embodiment, a broadband wavelet is used in the source wavefield modeling, thereby preserving the low wavenumber components in the velocity update. Additionally, a pre-condition is applied to the imaging condition in order to remove a second order temporal of the imaging condition, thereby preserving low wavenumber components in the velocity update. Compared to traditional FWI, the disclosed HR-FWI workflow generates higher accuracy and higher resolution velocity models with same input data (for example, the same initial velocity model).

Aspects of the subject matter described in this specification may be embodied in methods that include the actions of: generating, using a source wavelet and a current velocity model, modeled seismic data of the subterranean formation; applying a pre-condition to a seismic data residual calculated using the modeled seismic data and acquired seismic data from the subterranean formation; generating a velocity update using the source wavelet and the pre-conditioned seismic data residual; updating, using the velocity update, the current velocity model to generate an updated velocity model; determining that the current velocity model satisfies a predetermined condition; and responsively determining that the updated velocity model is the velocity model of the subterranean formation.

The previously-described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In a first aspect, where determining that the current velocity model satisfies the predetermined condition is during a first instance of performing an iterative loop, and wherein, during a second instance of performing the iterative loop, determining that the current velocity model does not satisfy the predetermined condition; and responsively repeating the iterative loop until an occurrence of the predetermined condition or until a selected number of iterative loops is completed.

In a second aspect, where the source wavelet is a zero-phase broadband wavelet.

In a third aspect, where the pre-condition applies a double integral to the data residual.

In a fourth aspect, where generating the velocity update using the source wavelet and the pre-conditioned seismic data residual comprises: using the current velocity model to forward propagate the source wavelet to generate a source wavefield; using the current velocity model to backward propagate the pre-conditioned seismic data residual to generate a backward propagating wavefield of the pre-conditioned seismic data residual; and cross-correlating the source wavefield and the backward propagating wavefield to generate the velocity update.

In a fifth aspect, where generating the velocity update using the source wavelet and the pre-conditioned seismic data residual further comprises: removing a tomography part of the velocity update and preserving a reflection part of the velocity update.

In a sixth aspect, where the predetermined condition is a threshold accuracy.

The subject matter described in this specification can be implemented in particular implementations, so as to realize one or more of the following advantages.

In an example, the disclosed high-resolution full waveform inversion workflow can be used to generate velocity models of complex subsurfaces. In practice, subsurface exploration is being performed in increasingly complex subsurfaces. Legacy workflows, such as legacy FWI, cannot generate accurate models in such complex subsurfaces. The disclosed high-resolution full waveform inversion workflow, however, can be used to generate accurate velocity models of the complex subsurfaces. Compared to the legacy FWI, the disclosed workflow generates higher accuracy and higher resolution velocity models using the same initial model and same input data as those used in legacy FWI. In particular, the disclosed workflow preserves low frequency components when performing full waveform inversion to generate a velocity model, thereby improving the resolution and accuracy of the model. Furthermore, the disclosed workflow can handle complex velocity models and does not require smoothing of the seismic data.

Yet further, the disclosed workflow improves the efficiency of drilling processes that rely on velocity models. In particular, a velocity model generated by the disclosed workflow can be used to directly determine an impedance of a subterranean formation. In contrast, velocity models generated using traditional methods are used in an impedance inversion calculation, which is used to obtain a final reservoir description. In the disclosed workflow, however, because the generated velocity model has a high enough resolution, the velocity model can be used to directly obtain the impedance of the reservoir, and, thus, no inversion is required.

The details of one or more embodiments of the present disclosure are set forth in the accompanying drawings and the description to follow. Other features, objects, and advantages of the present disclosure will be apparent from the description and drawings, and from the claims.

DESCRIPTION OF DRAWINGS

FIGS. 1A and 1B illustrate time and frequency representations of a Ricker wavelet and a broadband wavelet, according to some implementations of the present disclosure.

FIGS. 2A, 2B, and 2C illustrate full waveform inversion gradients, according to some implementations of the present disclosure.

FIGS. 4A and 4B illustrate synthetic data generated using Ricker and broadband wavelets, according to some implementations of the present disclosure.

Like reference symbols in the various drawings indicate like elements.

DETAILED DESCRIPTION

Figure 2B:
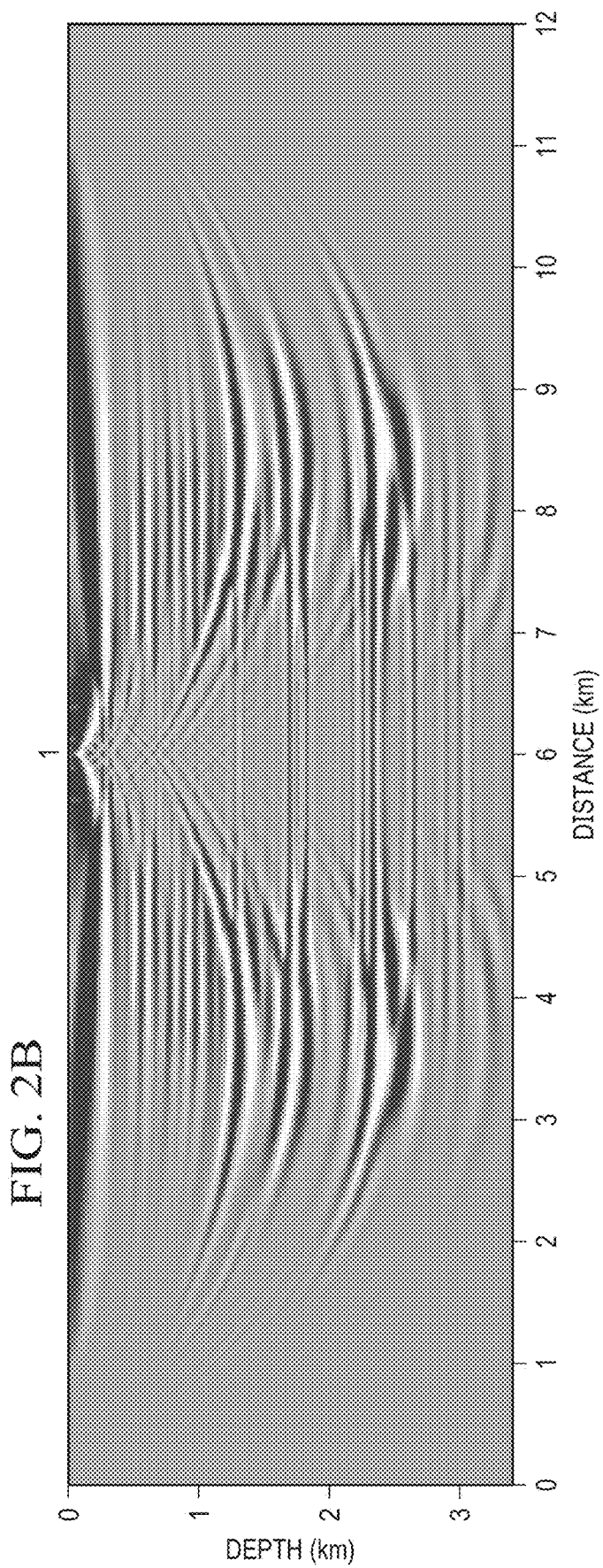

As previously described, seismic velocity model building has traditionally been performed using ray-tomography, which involves improving the flatness of offset pre-stack common image gathers (ODCIG) or angle domain pre-stack common image gathers (ADCIG). The velocity model that is derived using ray-tomography is referred to as a "migration velocity" model because it is typically used for seismic migration. This velocity model is also referred to as a "macro velocity" model because the resolution of the model is usually low. Having low resolution is one of the limitations of velocity models generated by ray-tomography methods. Generally, a low resolution model is one that is missing sharp boundaries, or in the wavenumber domain, large wavenumber components are missing.

More recently, a technology known as "full waveform inversion" (FWI) is increasingly being used for building velocity models. Generally, FWI builds a velocity model for a subsurface by using an iterative process that reduces the difference between modeled seismic data of the subsurface and actual seismic data acquired from the subsurface. In each iteration of the velocity model building process, FWI seeks to minimize the difference between the modeled seismic data and the actual seismic data until a threshold difference is achieved.

The input for FWI is observed seismic data, an initial velocity model (for example, generated using the acquired seismic data), and perhaps an earth model of the subsurface (for example, generated using the acquired seismic data). During a first iteration, FWI uses the initial velocity model and a source wavelet to generate modeled seismic data in a process referred to as forward modeling. FWI compares the modeled seismic data to the acquired seismic data, and, based on the comparison, generates residual seismic data (for example, based on a difference between the modeled and acquired seismic data). The residual seismic data is backward propagated through the earth model in order to generate a backward propagating wavefield of the residual data and the seismic source is forward propagated through the earth model to generate a forward propagating wavefield (also referred to as a source or shot wavefield). The backward propagating wavefield is compared (for example, cross-correlated) with the forward propagating wavefield in order to calculate a directional change in velocity called a gradient. The velocity model is updated using the calculated gradient. In the next iteration, FWI uses the updated velocity model to generate the modeled seismic data, which it then compares to the acquired seismic data to generate another update to the velocity model. This process is iteratively performed until the residual seismic data meets a selected value or is within a predetermined range.

In some examples, FWI uses an objective function (for example, a cost function) to represent the difference between the modeled and acquired seismic data. Updating the direction, or rate, or both of the velocity data contained in the velocity model is accomplished by taking a partial derivative of the objective function with respect to velocity. This partial derivative, or gradient, provides an indication of a direction of movement of the velocity, which is used to adjust the velocity model prior to the next iterative loop. In an implementation, the gradient is based on the objective function's direction of steepest descent.

In one application, similar to ray-tomography, FWI generates a macro velocity model that is used for seismic migration. In another application, when the initial velocity model is accurate enough and the observed seismic data includes low frequency information, FWI can generate a high-resolution velocity model that can directly be used for interpretation and drilling position determination. In an example, the initial velocity model is accurate enough when no cycle-skipping exists between the real and synthetic data that is generated using this initial velocity model.

This disclosure is directed to a workflow for generating a high-resolution velocity model when a good initial velocity model and low frequency information in the acquired seismic data are available. The range of frequencies included in the low frequency information may depend on various factors, such as the method of acquisition (for example, marine or land acquisition). In some examples, low frequency information includes frequency components less than or equal to one hertz (Hz) or less than or equal to three Hz. As such, a frequency range of approximately one hertz to three hertz is the low-frequency information, but there is no limit on these values. It is within the scope of the disclosure for the range of low-frequency information to extend beyond three hertz or be less than three hertz. For example, a range of low-frequency information can be within a range of one hertz to six hertz.

In particular, this disclosure describes a closed-loop workflow for high-resolution full waveform inversion (HR-FWI). HR-FWI involves an up-going and down-going wavefield separation imaging condition to generate a reflection image as the gradient. In the disclosed workflow, the low frequency components are preserved during FWI, thereby enhancing the resolution of the FWI result. In an embodiment, a broadband wavelet is used in the source wavefield modeling, thereby preserving the low wavenumber components in the gradient. Additionally, a pre-condition is applied to the imaging condition in order to remove a second order temporal of the imaging condition, thereby also preserving low wavenumber components in the gradient. Compared to traditional FWI, the disclosed workflow generates higher accuracy and higher resolution velocity models with same input data (for example, the same initial velocity model).

During the modeling of the source wavefield in FWI, the choice of wavelet affects the gradient because the gradient is based on a data residual that is filtered by the source wavefield. In traditional FWI, an estimated wavelet from the seismic data is used as the source field. In some examples, the source wavefield is generated by wave propagation from a point Ricker source function. The disclosed workflow, however, replaces the Ricker wavelet with a zero-phase broadband wavelet. The zero-phase broadband wavelet has a wider bandwidth than the Ricker wavelet. Thus, since the gradient is based on a data residual filtered by the source wavefield, using the broadband wavelet will result in a wider bandwidth of the gradient than otherwise achievable with the Ricker wavelet, thereby improving the resolution of the gradient.

FIGS. 1A and 1B illustrate time and frequency representations of a Ricker wavelet and a broadband wavelet, according to some implementations. FIG. 1A illustrates a graph 100 of time-based representations 102, 104 of a Ricker wavelet and broadband wavelet, respectively. FIG. 1B illustrates a graph 110 of frequency spectrums 106, 108 of the Ricker wavelet and the broadband wavelet, respectively. As shown in FIG. 1B, the frequency spectrum 108 of the broadband wavelet is broader than the frequency spectrum 106 of the Ricker wavelet. Thus, using the broadband wavelet during the source wavefield simulation will result in a wider bandwidth of the final gradient than using the Ricker wavelet. Accordingly, replacing the traditional Ricker wavelet with the broadband wavelet improves the resolution of the final FWI result.

Furthermore, applying the pre-condition on the imaging condition also preserves low wavenumber components in the gradient. As previously described, the gradient is calculated as a derivative of an objective function. In an implementation, the objective function is a cost function, C, that is defined in Equation (1) as:

$$C = \frac{1}{2}(\Delta d^T \Delta d). \quad (1)$$

In Equation (1), $\Delta d$ is the difference between modeled seismic data, $d_{cal}$, and observed seismic data, $d_{obs}$. The difference, or the data residual, is defined in Equation (2) as:

$$\Delta d = d_{cal} - d_{obs}. \quad (2)$$

Additionally, in Equation (1), $\Delta d^T$ is the transpose of $\Delta d$. In traditional FWI, the gradient is defined as:

$$J = \frac{\partial C}{\partial s} = \left(\frac{\partial d_{cal}}{\partial s}\right)^T \Delta d = -d^T \frac{\partial L}{\partial s}(L^* \Delta d). \quad (3)$$

In Equation (3), L is a forward modeling operator, L* is an adjoint backward modeling operator, and s is the velocity or slowness to be inverted. The operator $$\frac{\partial L}{\partial s}$$

is defined in Equation (4) as:

$$\frac{\partial L}{\partial s} \sim \omega^2. \quad (4)$$

As shown in Equation (4), the operator $$\frac{\partial L}{\partial s}$$

is a second order derivative in the time domain and is proportional to the square of the angular frequency. This operator increases the spectral frequency of the gradient, which slows down the convergence rate of FWI.

In the disclosed workflow, a pre-condition is applied to the data residual in order to remedy the spectral frequency of the gradient. Specifically, the pre-condition applies a double integration of the data residual $\Delta d$ before the data residual is backward propagated. As a result, the gradient defined in Equation (3) becomes a zero-lag cross-correlation between the forward modeled source wavefield and the backward propagated pre-conditioned data residual. Furthermore, since the pre-condition is a double integration operator, the pre-condition will preserve the low frequency components and improve convergence of FWI.

Figure 2C:
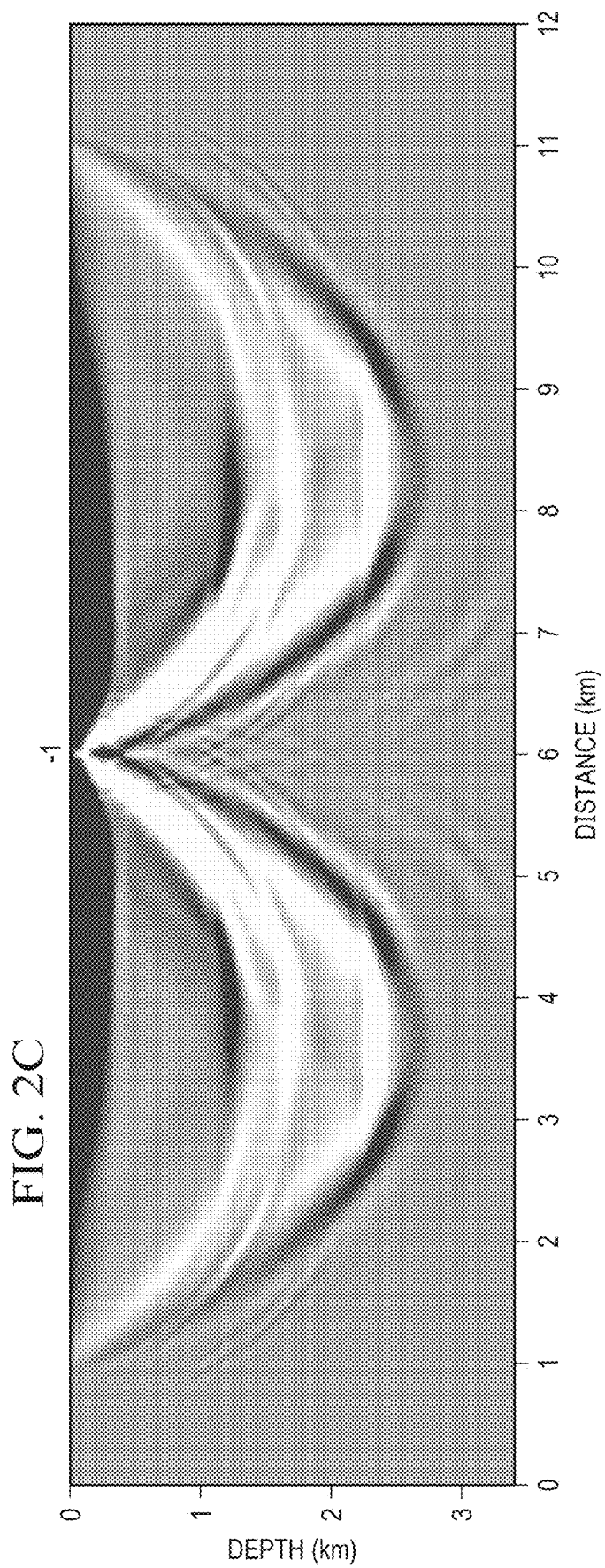

FIGS. 2A, 2B, 2C (collectively "FIG. 2") illustrate representations of a gradient, according to some implementations. In particular, FIG. 2 shows that the total computed gradient, shown in FIG. 2A, can be divided into two parts: a reflection gradient shown in FIG. 2B and a tomography gradient shown in FIG. 2C. The disclosed workflow is based on the assumption that the initial velocity model is accurate enough, and thus, only the reflection gradient is used and the tomographic part is removed from the gradient. This can be done by applying an imaging condition to the gradient, as shown in Equation (5):

$$J(x,z) = \int_0^{Tmax} (SR - h_z(S)h_z(R))dt. \quad (5)$$

In Equation (5), S is the source wavefield, R is the backward propagated data residual, and $h_z$ represents a Hilbert transform along the vertical direction.

Figure 3A:
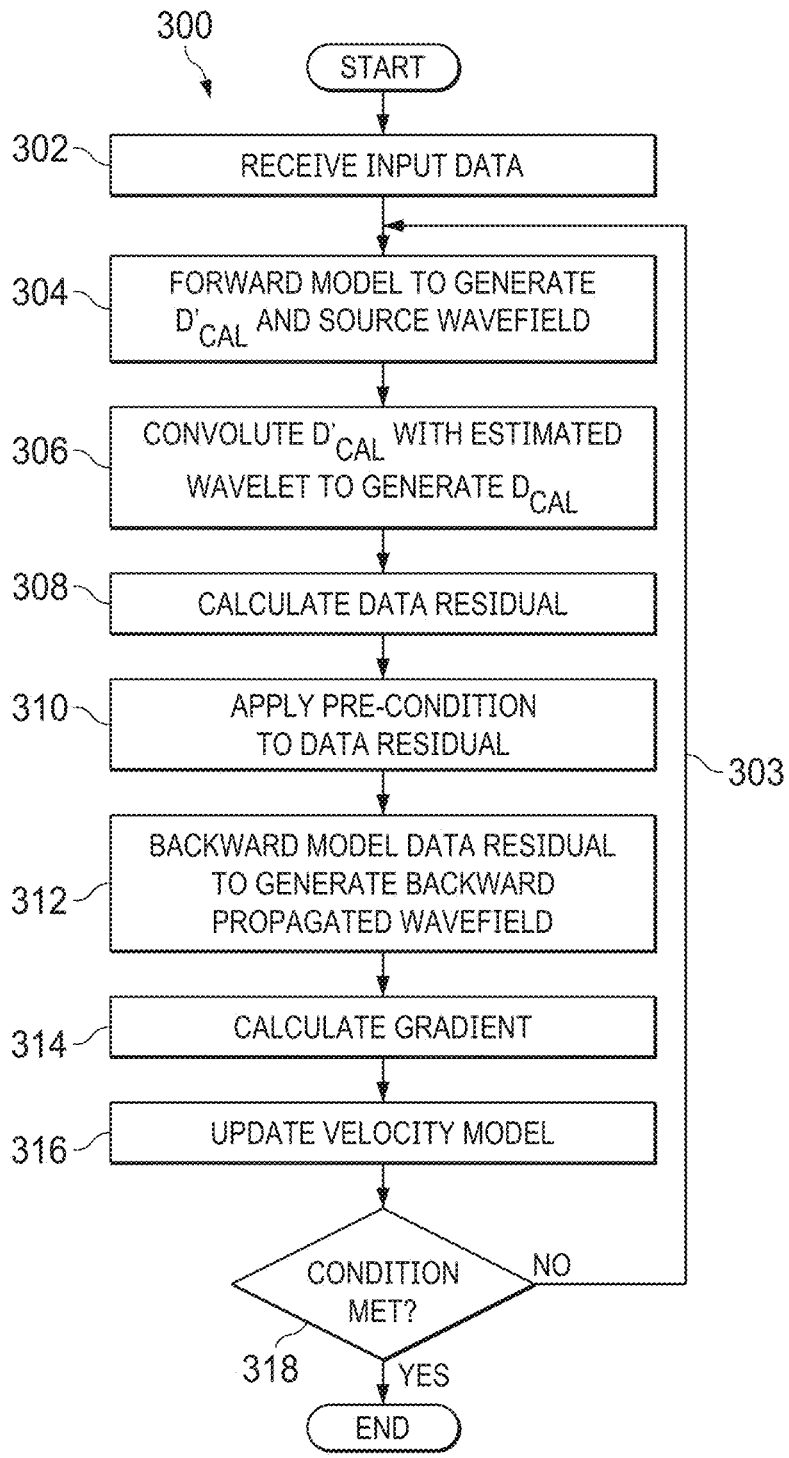
FIGS. 3A and 3B illustrate flowcharts of example methods for generating a velocity model, according to some implementations of the present disclosure.
Figure 3B:
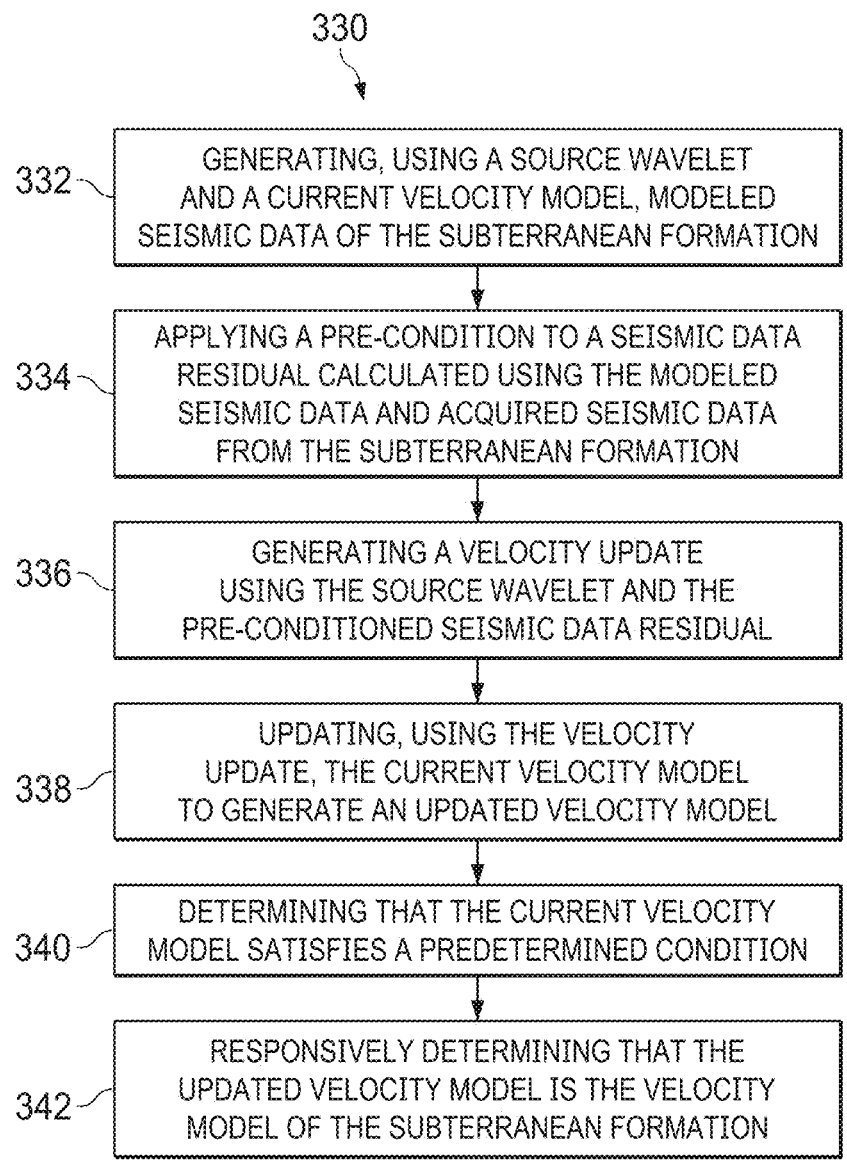

FIGS. 3A and 3B illustrate flowcharts of example methods 300, 330 for generating a velocity model, according to some implementations. The methods 300, 330 are closed-loop workflows for high-resolution full waveform inversion (HR-FWI). Thus, the methods 300, 330 use an iterative process for generating the velocity model. In these methods 300, 330, it is assumed that the acquired seismic data includes low frequency information. The following description describes both modeled seismic data and observed seismic data (also referred to as acquired seismic data). The term "modeled data" represents simulated data obtained from an initial velocity model (during a first iteration) or an updated velocity model (during each iteration after the first iteration).

For clarity of presentation, the description that follows generally describes methods 300, 330 in the context of the other figures in this description. For example, the methods 300, 330 can be performed by the computing system 700 shown in FIG. 7. However, it will be understood that the methods 300, 330 may be performed, for example, by any suitable system, environment, software, and hardware, or a combination of systems, environments, software, and hardware, as appropriate. In some implementations, various steps of the methods 300, 330 can be run in parallel, in combination, in loops, or in any order.

Turning to FIG. 3A, the method 300 starts at step 302, where input data is received. The input data includes acquired seismic data (for example, pre-stack seismic data) of a subterranean formation and an initial velocity model of the subterranean formation. The initial velocity model is based on well log data or the acquired seismic data, and is perhaps generated using ray-tomography or traditional FWI. In some examples, the initial velocity model is used to generate an earth model of the subterranean formation, which is built by assigning values of elastic material properties (for example, primary wave speed, shear wave speed, and density) at each spatial point/cell location in a computational grid. The assigned elastic material property values represent the Earth's geological structures desired to simulate the response of wave propagation.

The iterative loop 303 begins at step 304. This iterative loop operates to reduce a residual energy between the modeled seismic data and the acquired seismic data. Thus, during the course of the iterative loop, the velocity model is updated and optimized to produce a velocity model that would produce the acquired seismic data. In some implementations, the residual energy is minimized. For example, a result (for example, a residual energy) is minimized when the result meets a selected value or is within a predetermined range.

At step 304, forward modeling is used to generate a source wavefield and modeled seismic data, $d'_{cal}$. Forward modeling involves performing a wavefield simulation with a current velocity model and a source wavelet. In the first iteration of the method 300, the current velocity model is the initial velocity model, and in each subsequent iteration, the updated velocity model from the immediately preceding iteration is the current velocity model, in an implementation, the source wavelet is a zero-phase broadband wavelet (for example, the zero-phase broadband wavelet illustrated in FIG. 1). The wavefield simulation forward propagates the source wavelet to generate the source wavefield (also referred to as a "shot wavefield"), which is then used to generate the modeled seismic data. By way of example, a wave simulator can be used to forward model the modeled seismic data, $d'_{cal}$, perhaps using an earth model generated based on the current velocity model.

At step 306, because the modeled seismic data is generated using a broadband wavelet, a convolution using an estimated source wavelet is applied in order to generate modified modeled seismic data ($d_{cal}$) to be used to calculate the data residual in Equation (2). In an implementation, the estimated source wavelet is generated based on the received seismic data. Note that the modified modeled seismic data is also called synthetic data.

FIGS. 4A and 4B illustrate synthetic data generated using Ricker and broadband wavelets, according to some implementations. FIG. 4A illustrates the synthetic data generated using a Ricker wavelet as the source wavefield, and FIG. 4B illustrates the synthetic data generated using a broadband wavelet as the source wavefield.

At step 308, a data residual is calculated using the acquired seismic data and modified modeled seismic data, $d_{cal}$. For example, as shown in Equation (2), the data residual is calculated as the difference between the modified modeled seismic data, $d_{cal}$, and the acquired seismic data, $d_{obs}$.

At step 310, a pre-condition is applied to the data residual. In an implementation, the pre-condition is a double integration of the data residual. This pre-condition removes a second order temporal of the data residual.

At step 312, the pre-conditioned data residual is backward propagated using the current velocity model to generate a backward propagating wavefield of the residual seismic data. In an example, an adjoint simulator is used to backward propagate the pre-conditioned data residual.

At step 314, a gradient is calculated. In an implementation, the gradient is generated using the backward propagating wavefield of the residual seismic data and the source wavefield. As previously described, the source wavelet is forward propagated using the current velocity model to generate a source wavefield, perhaps using a wavefield simulator. For example, the gradient is calculated using Equation (5), and therefore, the tomographic part is removed from the gradient and only the reflection part is used. As previously described, the gradient is a partial derivative of the objective function of Equation (1) and provides an indication of a direction of movement of the velocity. In some examples, the gradient is based on the objective function's direction of steepest descent.

At 316, the current velocity model is updated using the determined gradient. For example, once the gradient, J, is computed, the velocity or slowness is updated using Equation (6):

$$s^{k+1} = s^k + \alpha_k J^k. \qquad (6)$$

In Equation (6), $\alpha_k$ is a step length and s is a model parameter (for example, velocity). As shown in Equation (6), the updated velocity model is generated by adding a product of the step length and the current gradient to the current velocity model.

At 318, a determination is made as to whether to repeat the iterative cycle and return to 304. This iterative process may continue based on one or more of the following conditions. For example, the iterative loop may be repeated until the residual energy between the modeled seismic data based on the updated velocity model and the acquired seismic data is reduced to at or less than a selected value, until the residual energy is no longer decreasing, until the residual energy is decreasing at a rate less than a selected rate, or a selected number of iterative loops 303 has been accomplished. If the determination is made to repeat the iterative loop, the iteration restarts and the iterative loops 303 continues until a decision at 318 stops the iteration cycles. During the next iteration, the updated velocity model from the immediately preceding iteration is the current velocity model that is used during that iteration. If the determination is made not to repeat the iterative loop, then the updated velocity model is used as the velocity model for the subterranean formation.

Turning to FIG. 3B, the method 330 starts at step 332 that involves generating, using a source wavelet and a current velocity model, modeled seismic data of a subterranean formation. At step 334, the method 330 involves applying a pre-condition to a seismic data residual calculated using the modeled seismic data and acquired seismic data from the subterranean formation. At step 336, the method 330 involves generating a velocity update using the source wavelet and the pre-conditioned seismic data residual. At step 338, the method 330 involves updating, using the velocity update, the current velocity model to generate an updated velocity model. At step 340, the method 330 involves determining that the current velocity model satisfies a predetermined condition. At step 342, the method 330 involves responsively determining that the updated velocity model is the velocity model of the subterranean formation.

The example method 330 shown in FIG. 3B can be modified or reconfigured to include additional, fewer, or different steps (not shown in FIG. 3B), which can be performed in the order shown or in a different order. As an example, after step 342, the method 330 can include using the velocity model of the subterranean formation to directly determine the impedance of the subterranean formation. Traditionally, the higher resolution seismic image is used for interpretation and impedance inversion to get a final reservoir description. However, in this workflow, because the final FWI velocity model has a high enough resolution, the final velocity model can be used to directly obtain the impedance of the reservoir, and, thus, no inversion is required. As another example, the method 330 can include using the final velocity model and the impedance of the subterranean formation for drilling position determination. As yet another example, the method 330 can include drilling, based on the drilling position determination and using a drilling system, one or more wellbores in the subterranean formation. For example, the method 330 may involve using a drilling system 800 shown in FIG. 8 to drill one or more wellbores in the subterranean formation.

Figure 5A:
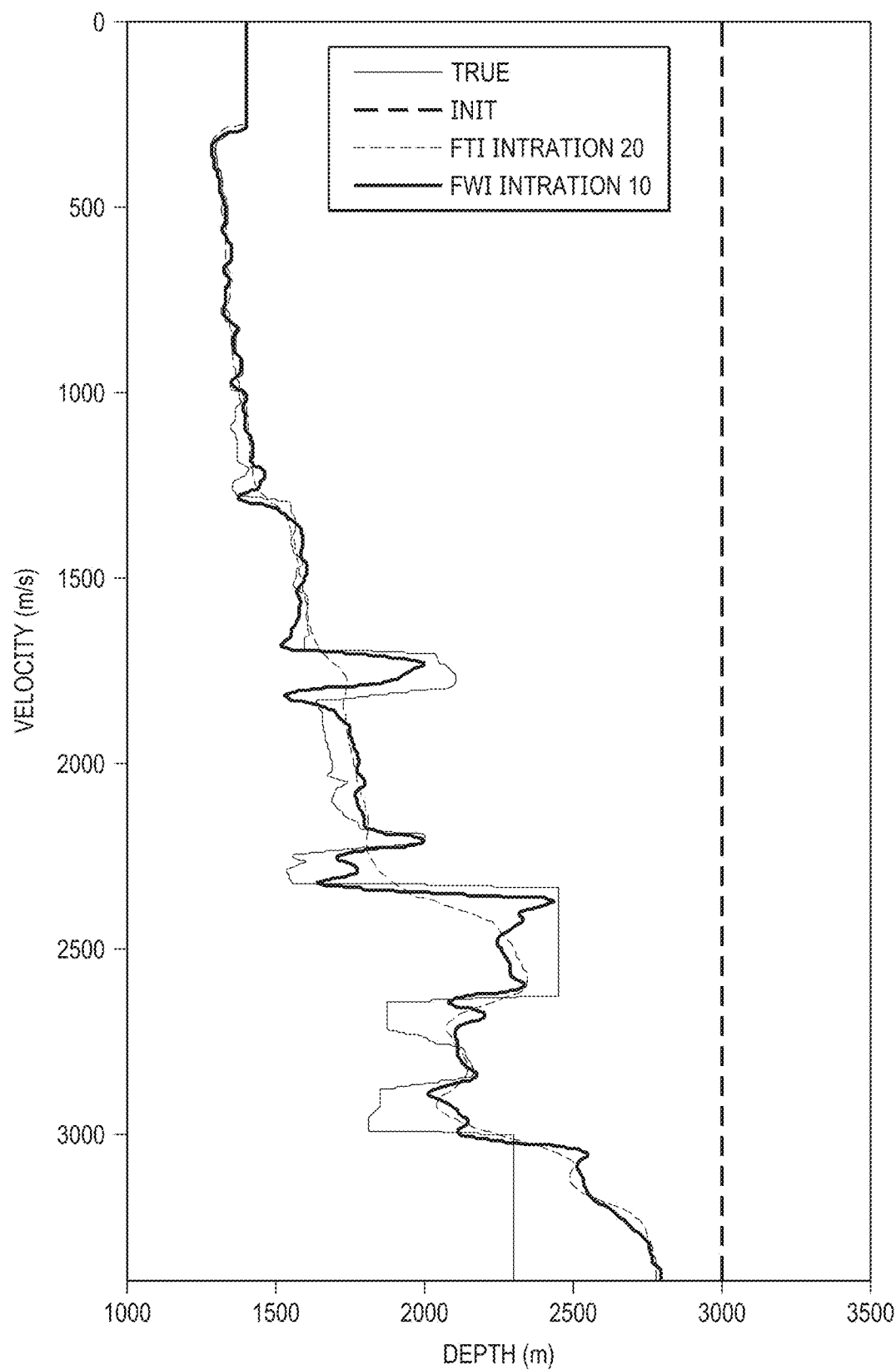
FIGS. 5A, 5B, and 5C illustrate full waveform inversion results, according to some implementations of the present disclosure.
Figure 5B:
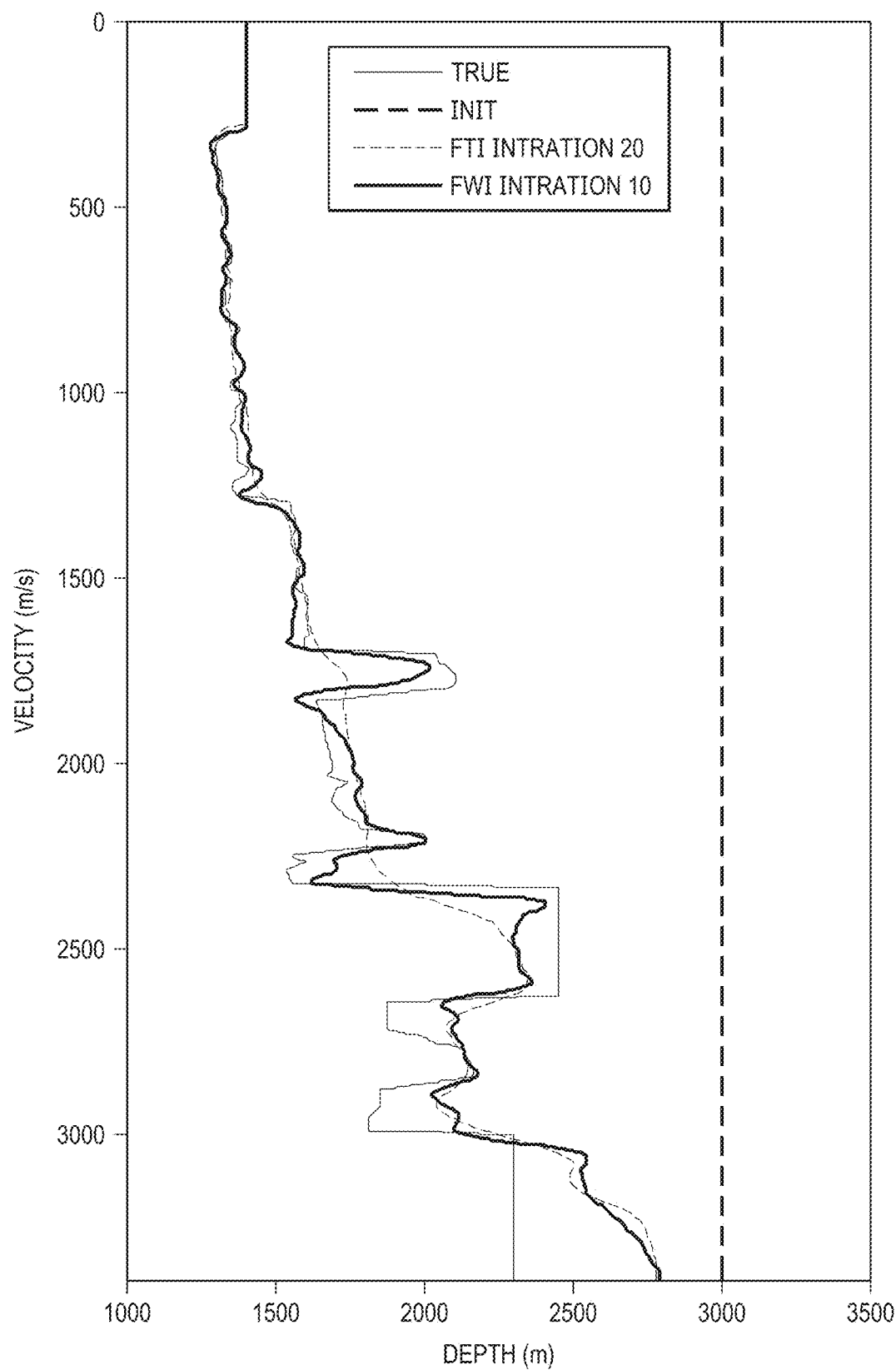
Figure 5C:
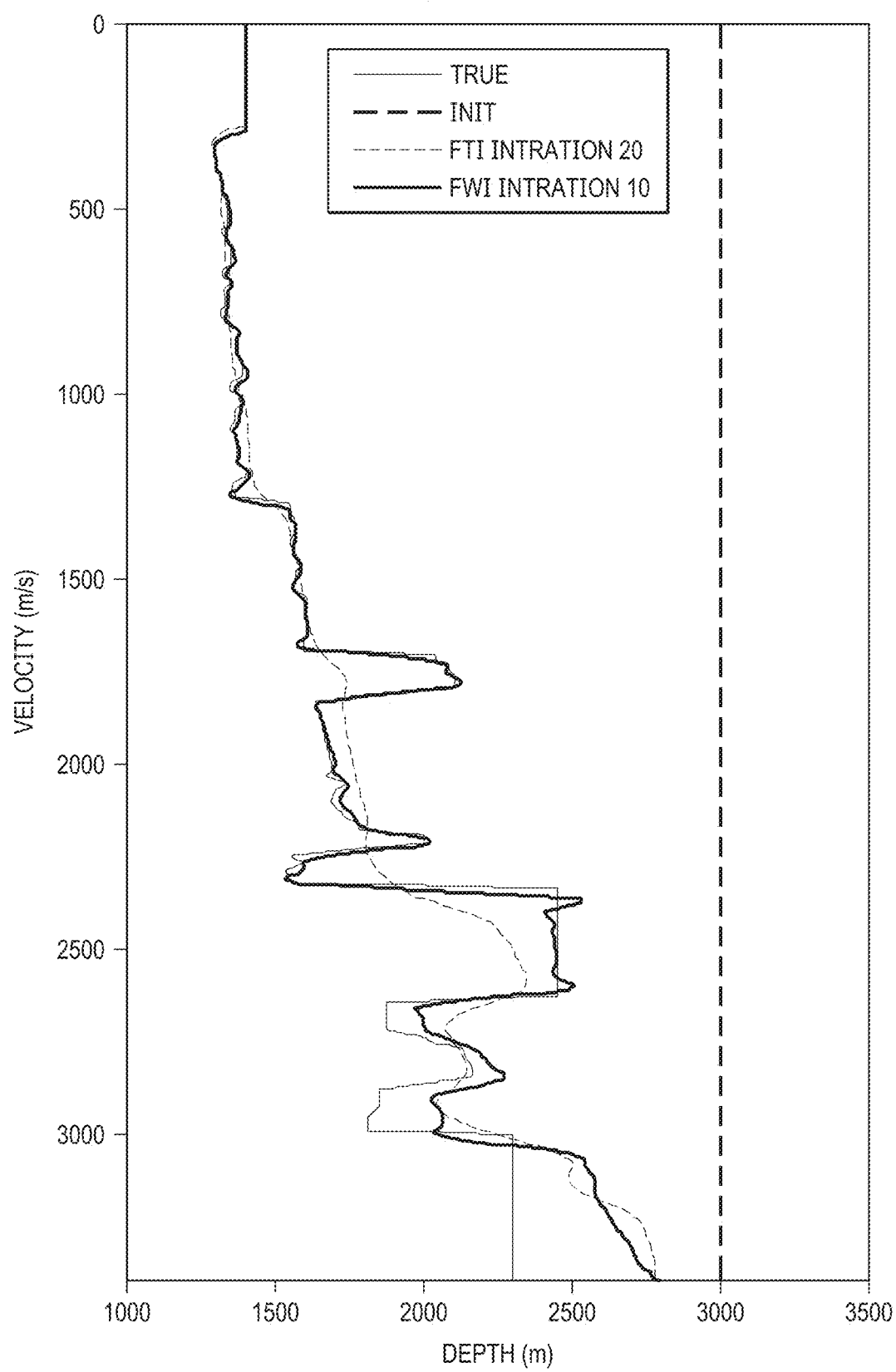

FIGS. 5A, 5B, and 5C (collectively "FIG. 5") illustrate full waveform inversion results, according to some implementations of the present disclosure. In particular, FIG. 5 illustrates a two-dimensional (2D) example of a flat-layered model. FIG. 5A illustrates a traditional FWI result, FIG. 5B illustrates a pre-conditioned FWI result using a Ricker wavelet, and FIG. 5C illustrates a pre-conditioned FWI result using a broadband wavelet. The input for each of the processes, which is a constant indicated by the black line, is the same. Full travel-time inversion (FTI) is applied to the input to generate the initial velocity, which is represented by the green line. The result of the FWI performed by each process is represented by the blue line. As shown in FIG. 5, except the bottom layers, the result of HR-FWI matches the line model, which is represented by the red line. As also shown by FIG. 5, the resolution and accuracy of HR-FWI is much greater than traditional FWI.

Figure 6A:
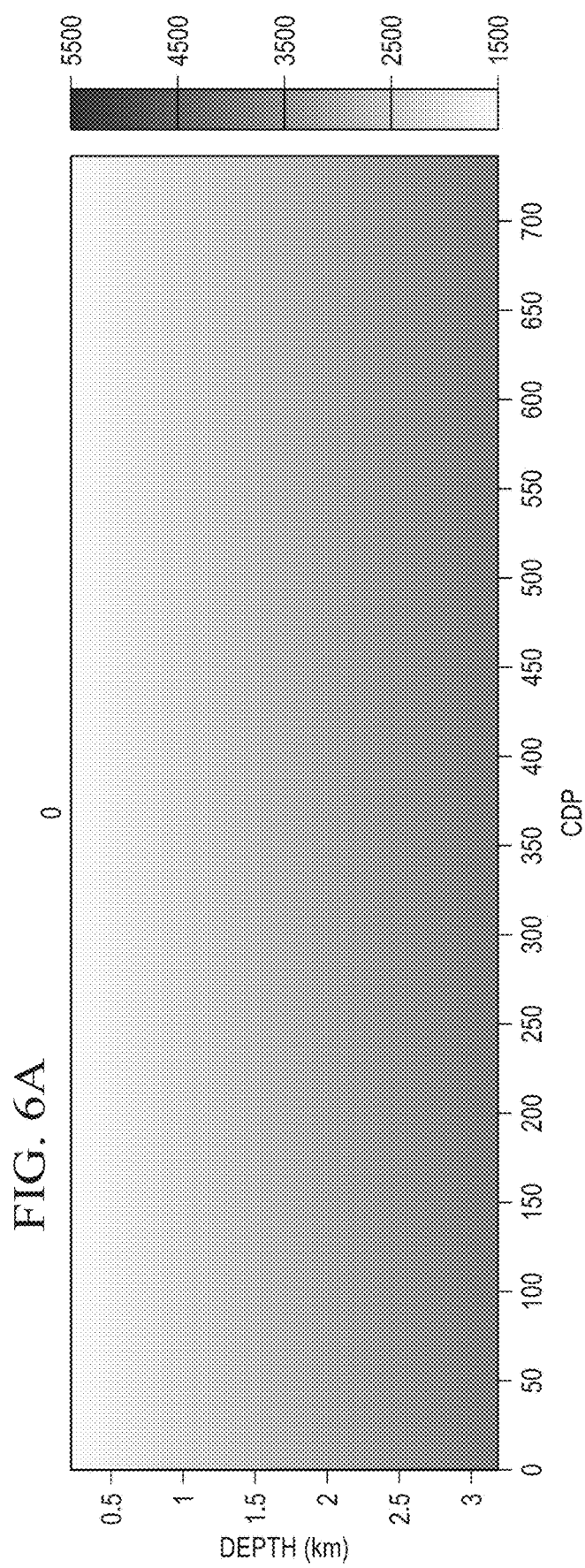
FIGS. 6A, 6B, and 6C illustrate the results of a numerical test performed on a two-dimensional velocity model, according to some implementations of the present disclosure.
Figure 6B:
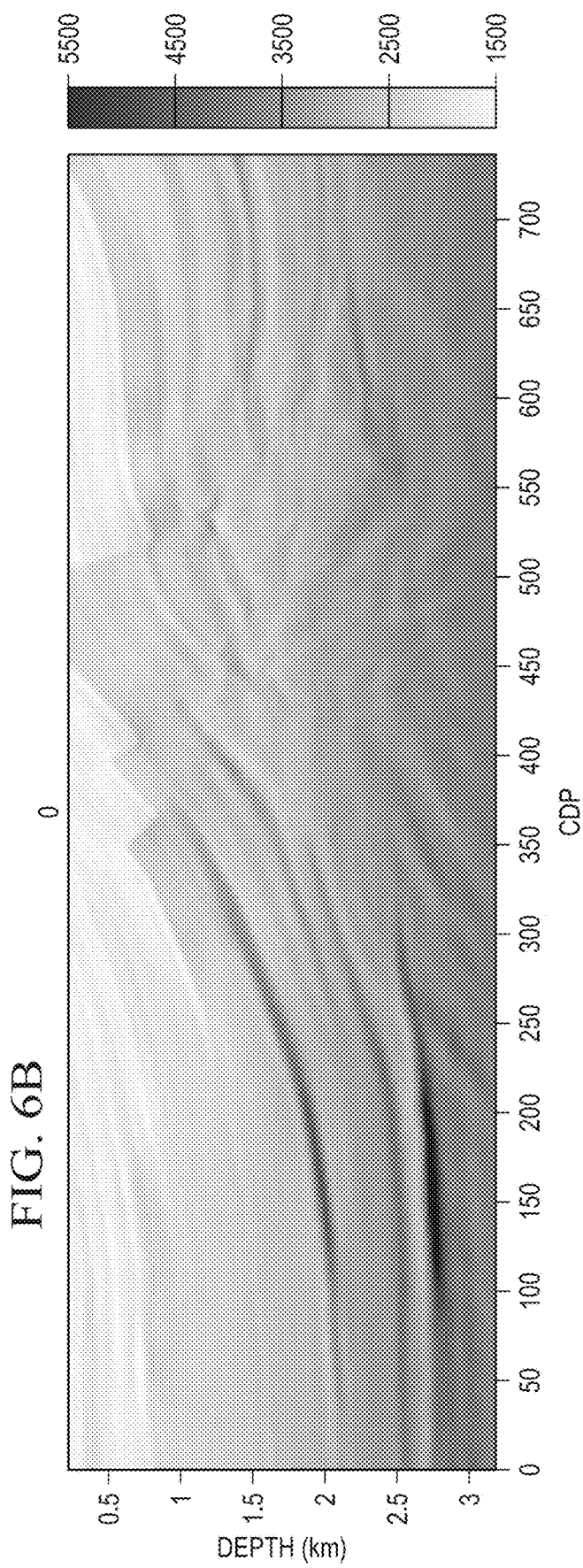
Figure 6C:
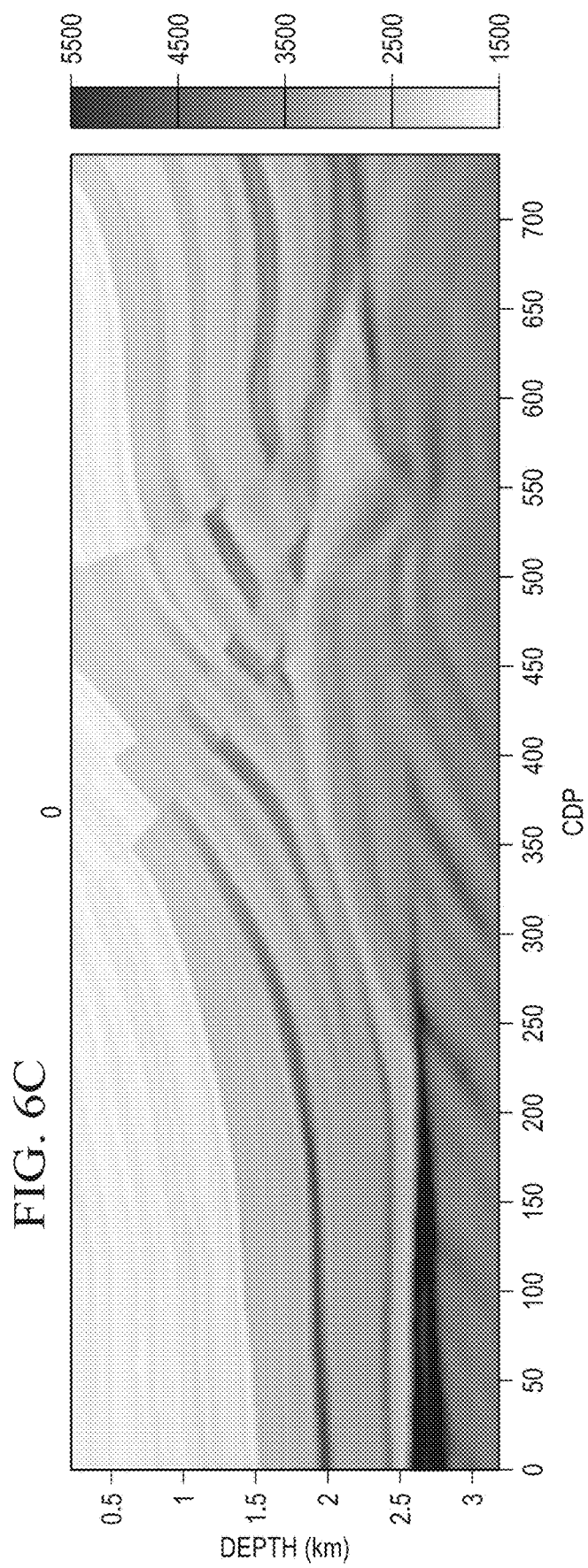

FIGS. 6A, 6B, and 6C (collectively "FIG. 6") illustrate the results of a numerical test performed on a two-dimensional velocity model, according to some implementations. In particular, FIG. 6 illustrates a 2D Marmousi model. FIG. 6A illustrates an initial velocity, FIG. 6B illustrates a pre-conditioned FWI result using a Ricker wavelet, and FIG. 6C illustrates a pre-conditioned FWI result using a broadband wavelet (that is HR-FWI). As shown in FIG. 6, the result of the pre-conditioned FWI result using a Ricker wavelet is accurate except for the central complex area. As also shown in FIG. 6, the result of HR-FWI is more accurate and has a greater resolution than the pre-conditioned FWI result using a Ricker wavelet, particularly in the central complex areas.

Figure 7:
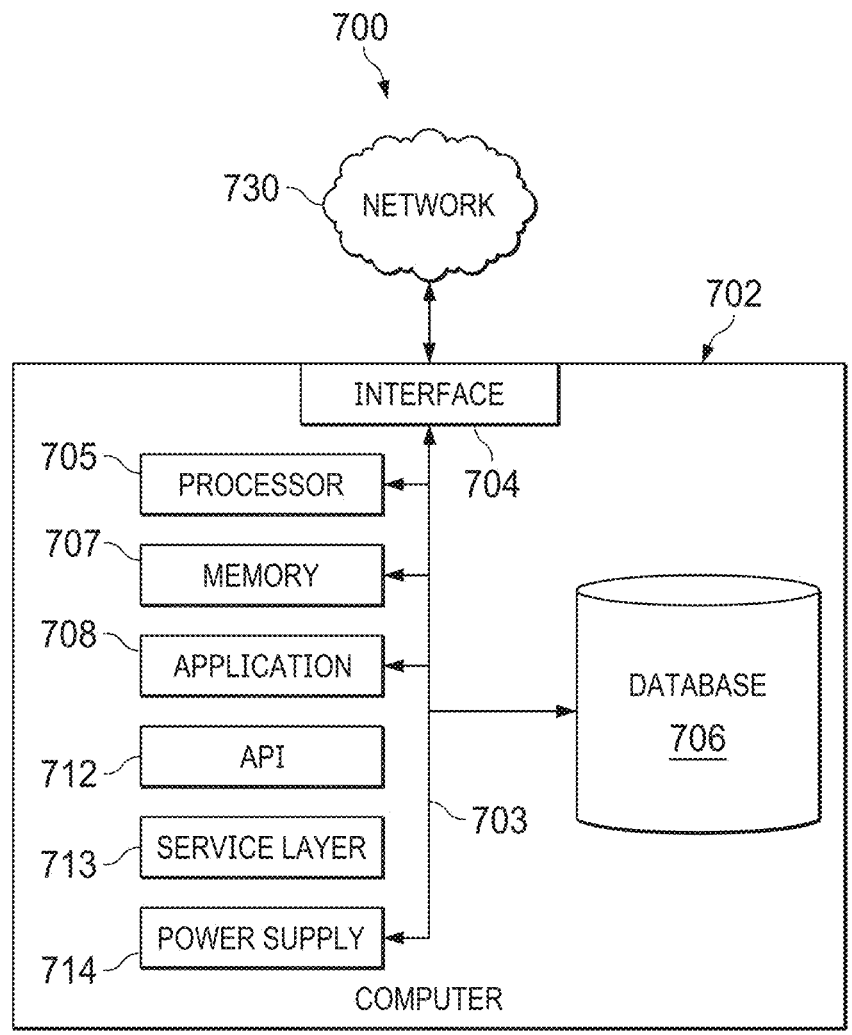
FIG. 7 illustrates a block diagram illustrating an example computer system, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a high level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser; a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

Figure 8:
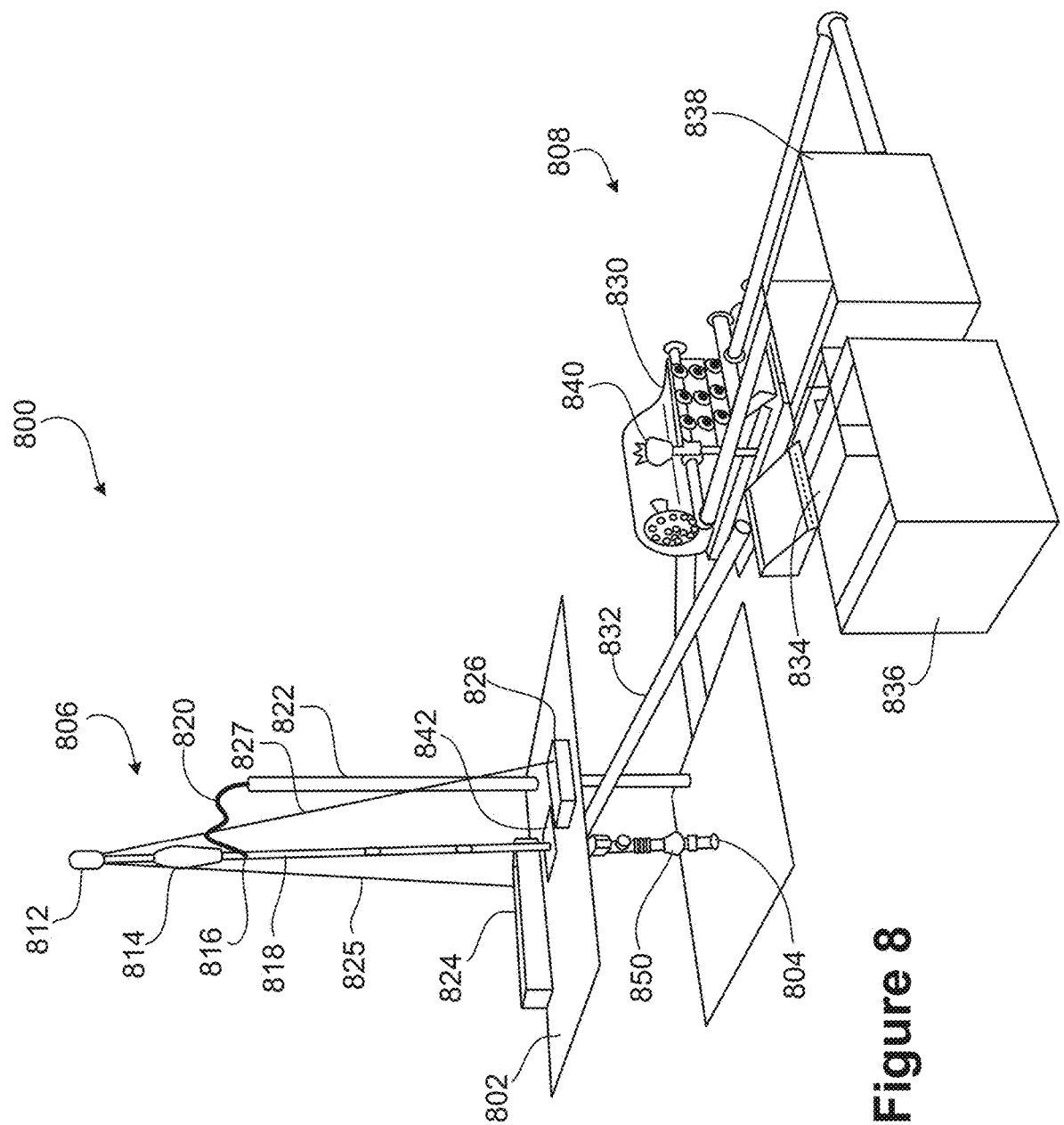
FIG. 8 is a partial schematic perspective view of an example rig system 100 for drilling and producing a well, according to some implementations of the present disclosure.

FIG. 8 is a partial schematic perspective view of an example rig system 100 for drilling and producing a well. The well can extend from the surface through the Earth to one or more subterranean zones of interest. The example rig system 800 includes a drill floor 802 positioned above the surface, a wellhead 804, a drill string assembly 806 supported by the rig structure, and a fluid circulation system 808 to filter used drilling fluid from the wellbore and provide clean drilling fluid to the drill string assembly 806. For example, the example rig system 800 of FIG. 8 is shown as a drill rig capable of performing a drilling operation with the rig system 800 supporting the drill string assembly 806 over a wellbore. The wellhead 804 can be used to support casing or other well components or equipment into the wellbore of the well.

The derrick or mast is a support framework mounted on the drill floor 802 and positioned over the wellbore to support the components of the drill string assembly 806 during drilling operations. A crown block 812 forms a longitudinally-fixed top of the derrick, and connects to a travelling block 814 with a drilling line including a set of wire ropes or cables. The crown block 812 and the travelling block 814 support the drill string assembly 806 via a swivel 816, a kelly 818, or a top drive system (not shown). Longitudinal movement of the travelling block 814 relative to the crown block 812 of the drill string assembly 806 acts to move the drill string assembly 806 longitudinally upward and downward. The swivel 816, connected to and hung by the travelling block 814 and a rotary hook, allows free rotation of the drill string assembly 806 and provides a connection to a kelly hose 820, which is a hose that flows drilling fluid from a drilling fluid supply of the circulation system 808 to the drill string assembly 806. A standpipe 822 mounted on the drill floor 802 guides at least a portion of the kelly hose 820 to a location proximate to the drill string assembly 806. The kelly 818 is a hexagonal device suspended from the swivel 816 and connected to a longitudinal top of the drill string assembly 806, and the kelly 818 turns with the drill string assembly 806 as the rotary table 842 of the drill string assembly turns.

In the example rig system 800 of FIG. 8, the drill string assembly 806 is made up of drill pipes with a drill bit (not shown) at a longitudinally bottom end of the drill string. The drill pipe can include hollow steel piping, and the drill bit can include cutting tools, such as blades, dies, rollers, cutters, or a combination of these, to cut into the formation and form the wellbore. The drill bit rotates and penetrates through rock formations below the surface under the combined effect of axial load and rotation of the drill string assembly 806. In some implementations, the kelly 818 and swivel 816 can be replaced by a top drive that allows the drill string assembly 806 to spin and drill. The wellhead assembly 804 can also include a drawworks 824 and a deadline anchor 826, where the drawworks 824 includes a winch that acts as a hoisting system to reel the drilling line in and out to raise and lower the drill string assembly 806 by a fast line 825. The deadline anchor 826 fixes the drilling line opposite the drawworks 824 by a deadline 827, and can measure the suspended load (or hook load) on the rotary hook. The weight on bit (WOB) can be measured when the drill bit is at the bottom the wellbore. The wellhead assembly 804 also includes a blowout preventer 850 positioned at the surface of the well and below (but often connected to) the drill floor 802. The blowout preventer 850 acts to prevent well blowouts caused by formation fluid entering the wellbore, displacing drilling fluid, and flowing to the surface at a pressure greater than atmospheric pressure. The blowout preventer 850 can close around (and in some instances, through) the drill string assembly 806 and seal off the space between the drill string and the wellbore wall. The blowout preventer 850 is described in more detail later.

During a drilling operation of the well, the circulation system 808 circulates drilling fluid from the wellbore to the drill string assembly 806, filters used drilling fluid from the wellbore, and provides clean drilling fluid to the drill string assembly 806. The example circulation system 808 includes a fluid pump 830 that fluidly connects to and provides drilling fluid to drill string assembly 806 via the kelly hose 820 and the standpipe 822. The circulation system 808 also includes a flow-out line 832, a shale shaker 834, a settling pit 836, and a suction pit 838. In a drilling operation, the circulation system 808 pumps drilling fluid from the surface, through the drill string assembly 806, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, thereby creating a path for the drilling fluids to go into the formation. Apart from well control, drilling fluids can also cool the drill bit and lift rock cuttings from the drilled formation up the annulus and to the surface to be filtered out and treated before it is pumped down the drill string assembly 806 again. The drilling fluid returns in the annulus with rock cuttings and flows out to the flow-out line 832, which connects to and provides the fluid to the shale shaker 834. The flow line is an inclined pipe that directs the drilling fluid from the annulus to the shale shaker 834. The shale shaker 834 includes a mesh-like surface to separate the coarse rock cuttings from the drilling fluid, and finer rock cuttings and drilling fluid then go through the settling pit 836 to the suction pit 836. The circulation system 808 includes a mud hopper 840 into which materials (for example, to provide dispersion, rapid hydration, and uniform mixing) can be introduced to the circulation system 808. The fluid pump 830 cycles the drilling fluid up the standpipe 822 through the swivel 816 and back into the drill string assembly 806 to go back into the well.

The example wellhead assembly 804 can take a variety of forms and include a number of different components. For example, the wellhead assembly 804 can include additional or different components than the example shown in FIG. 8. Similarly, the circulation system 808 can include additional or different components than the example shown in FIG. 8.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the present disclosure have been described. Nevertheless, it will be understood that various modifications may be made without departing from the spirit and scope of the present disclosure. Accordingly, other embodiments are within the scope of the following claims.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

What is claimed is:

1. A computer-implemented method for generating a velocity model of a subterranean formation, the method comprising:
    generating, using a source wavelet and a current velocity model, modeled seismic data of the subterranean formation;
    applying a pre-condition to a seismic data residual calculated using the modeled seismic data and acquired seismic data from the subterranean formation, wherein the pre-condition comprises a double integral that removes a second order temporal in the seismic data residual;
    generating a velocity update using the source wavelet and the pre-conditioned seismic data residual;
    updating, using the velocity update, the current velocity model to generate an updated velocity model;
    determining that the current velocity model satisfies a predetermined condition;
    responsively determining that the updated velocity model is the velocity model of the subterranean formation;
    performing using the updated velocity model drilling position determination; and
    drilling, based on the drilling position determination and using a drilling system, one or more wellbores in the subterranean formation.

2. The computer-implemented method of claim 1, wherein the method comprises an iterative loop, wherein determining that the current velocity model satisfies the predetermined condition is during a first instance of performing the iterative loop, and wherein the method further comprises:
    during a second instance of performing the iterative loop, determining that the current velocity model does not satisfy the predetermined condition; and
    responsively repeating the iterative loop until an occurrence of the predetermined condition or until a selected number of iterative loops is completed.

3. The computer-implemented method of claim 1, wherein the source wavelet is a zero-phase broadband wavelet.

4. The computer-implemented method of claim 1, wherein generating the velocity update using the source wavelet and the pre-conditioned seismic data residual comprises:
    using the current velocity model to forward propagate the source wavelet to generate a source wavefield;
    using the current velocity model to backward propagate the pre-conditioned seismic data residual to generate a backward propagating wavefield of the pre-conditioned seismic data residual; and
    cross-correlating the source wavefield and the backward propagating wavefield to generate the velocity update.

5. The computer-implemented method of claim 4, wherein generating the velocity update using the source wavelet and the pre-conditioned seismic data residual further comprises:
removing a tomography part of the velocity update and preserving a reflection part of the velocity update.

6. The computer-implemented method of claim 1, wherein the predetermined condition is a threshold accuracy.

7. A device comprising:
one or more processors; and
a non-transitory computer-readable storage medium coupled to the one or more processors and storing programming instructions for execution by the one or more processors, the programming instructions instructing the one or more processors to perform operations comprising:
generating, using a source wavelet and a current velocity model, modeled seismic data of the subterranean formation;
applying a pre-condition to a seismic data residual calculated using the modeled seismic data and acquired seismic data from the subterranean formation, wherein the pre-condition comprises a double integral that removes a second order temporal in the seismic data residual;
generating a velocity update using the source wavelet and the pre-conditioned seismic data residual;
updating, using the velocity update, the current velocity model to generate an updated velocity model;
determining that the current velocity model satisfies a predetermined condition;
responsively determining that the updated velocity model is the velocity model of the subterranean formation;
performing using the updated velocity model drilling position determination; and
drilling, based on the drilling position determination and using a drilling system, one or more wellbores in the subterranean formation.

8. The device of claim 7, wherein the operations comprise an iterative loop, wherein determining that the current velocity model satisfies the predetermined condition is during a first instance of performing the iterative loop, and wherein the operations further comprise:
during a second instance of performing the iterative loop, determining that the current velocity model does not satisfy the predetermined condition; and
responsively repeating the iterative loop until an occurrence of the predetermined condition or until a selected number of iterative loops is completed.

9. The device of claim 7, wherein the source wavelet is a zero-phase broadband wavelet.

10. The device of claim 7, wherein generating the velocity update using the source wavelet and the pre-conditioned seismic data residual comprises:
using the current velocity model to forward propagate the source wavelet to generate a source wavefield;
using the current velocity model to backward propagate the pre-conditioned seismic data residual to generate a backward propagating wavefield of the pre-conditioned seismic data residual; and
cross-correlating the source wavefield and the backward propagating wavefield to generate the velocity update.

11. The device of claim 10, wherein generating the velocity update using the source wavelet and the pre-conditioned seismic data residual further comprises:
removing a tomography part of the velocity update and preserving a reflection part of the velocity update.

12. The device of claim 7, wherein the predetermined condition is a threshold accuracy.

13. A non-transitory computer-readable medium storing instructions executable by a computer system to perform operations comprising:
applying a pre-condition to a seismic data residual calculated using the modeled seismic data and acquired seismic data from the subterranean formation, wherein the pre-condition comprises a double integral that removes a second order temporal in the seismic data residual;
generating a velocity update using the source wavelet and the pre-conditioned seismic data residual;
updating, using the velocity update, the current velocity model to generate an updated velocity model;
determining that the current velocity model satisfies a predetermined condition;
responsively determining that the updated velocity model is the velocity model of the subterranean formation;
performing using the updated velocity model drilling position determination; and
drilling, based on the drilling position determination and using a drilling system, one or more wellbores in the subterranean formation.

14. The non-transitory computer-readable medium of claim 13, wherein the operations comprise an iterative loop, wherein determining that the current velocity model satisfies the predetermined condition is during a first instance of performing the iterative loop, and wherein the operations further comprise:
during a second instance of performing the iterative loop, determining that the current velocity model does not satisfy the predetermined condition; and
responsively repeating the iterative loop until an occurrence of the predetermined condition or until a selected number of iterative loops is completed.

15. The non-transitory computer-readable medium of claim 13, wherein the source wavelet is a zero-phase broadband wavelet.

16. The non-transitory computer-readable medium of claim 13, wherein generating the velocity update using the source wavelet and the pre-conditioned seismic data residual comprises:
using the current velocity model to forward propagate the source wavelet to generate a source wavefield;
using the current velocity model to backward propagate the pre-conditioned seismic data residual to generate a backward propagating wavefield of the pre-conditioned seismic data residual; and
cross-correlating the source wavefield and the backward propagating wavefield to generate the velocity update.

17. The non-transitory computer-readable medium of claim 13, wherein the predetermined condition is a threshold accuracy.

* * * * *